Figure 1:
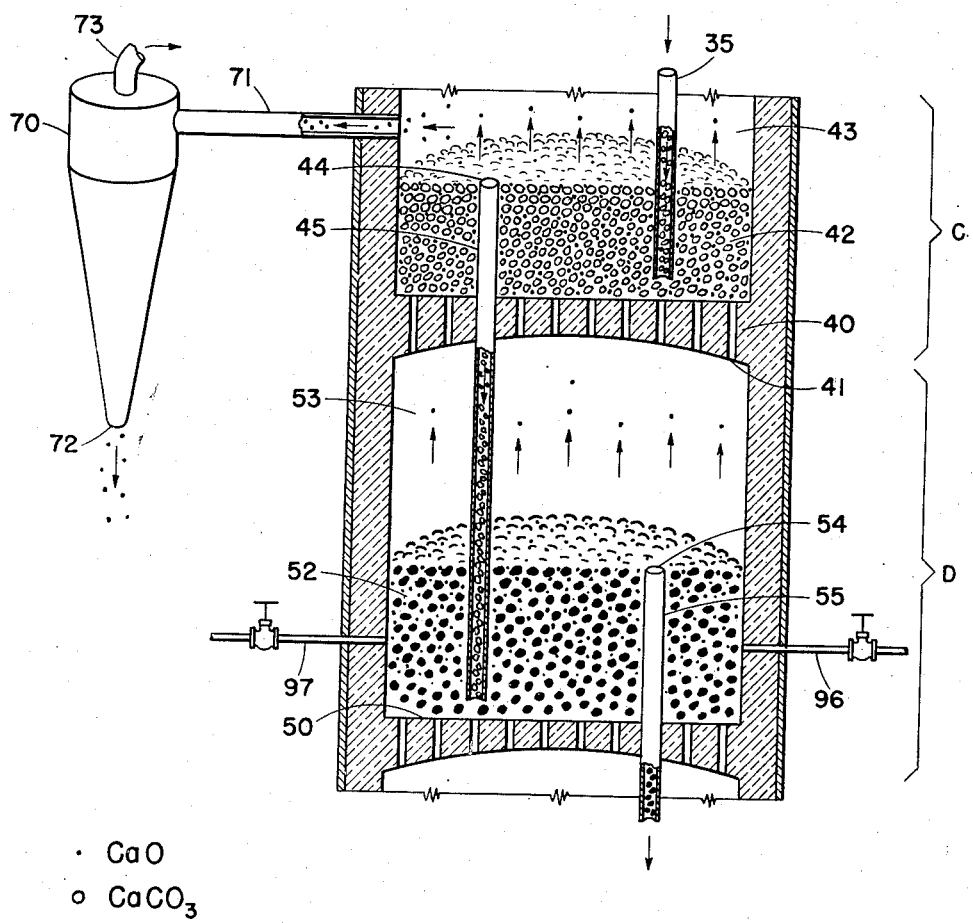

July 27, 1954     H. W. BEHME ET AL     2,684,840
CALCINING FINELY DIVIDED LIMESTONE
Filed April 6, 1951     2 Sheets-Sheet 1

Fig. I.

INVENTOR
HERMAN W. BEHME &
ROBERT B. THOMPSON
BY
ATTORNEY

July 27, 1954

H. W. BEHME ET AL 2,684,840

CALCINING FINELY DIVIDED LIMESTONE

Filed April 6, 1951

2 Sheets-Sheet 2

INVENTORS:
HERMANN W. BEHME &
ROBERT B. THOMPSON,
BY
Arthur Middleton
ATTORNEY

Patented July 27, 1954

2,684,840

UNITED STATES PATENT OFFICE 2,684,840

CALCINING FINELY DIVIDED LIMESTONE

Hermann W. Behme, Norwalk, and Robert B. Thompson, Wilton, Conn., assignors to The Dorr Company, Stamford, Conn., a corporation of Delaware Application April 6, 1951, Serial No. 219,624

3 Claims. (Cl. 263—53)

This invention relates generally to the calcination of limestone and more particularly to the more efficient calcination of finely divided limestone in fluidized solids reactors.

In the calcination of limestone employing the fluidized solids technique considerable difficulty is experienced due to excessive dust losses. This dust is of two types, (1) limestone dust ($CaCO_3$) formed when the limestone is crushed prior to introduction into the reactor, and (2) calcined lime dust (CaO) which is produced by the decrepitation or breakdown of calcined lime within the calcining chamber of the reactor. Both types of dust are salable products; the limestone ($CaCO_3$) finds extensive use as "agricultural stone" while the lime (CaO) is valuable as a reactant. However, the commercial worth of these products is directly dependent upon their purity; that is, limestone is of little value unless it is substantially free from calcined lime, and the calcined lime dust is of small worth unless it is substantially free from limestone. Therefore, it is important that the lime dust and the limestone dust be recovered separately from each other.

Heretofore, finely divided limestone has been calcined in multi-chambered fluidized solids reactors in which one or more superjacent chambers are maintained as limestone preheating chambers while one or more subjacent chambers are maintained as calcining chambers. In such reactors the lime (CaO) dust is carried from the calcining chamber entrained in a mixture of fluidizing gas and liberated $CO_2$ and such gas is passed through a cyclone or other dust-diminisher to recover such entrained lime dust as substantially pure product. The dust-free hot gases are then used to fluidize and preheat incoming limestone solids in the superjacent preheating beds. A major portion of the limestone ($CaCO_3$) dust is removed from the finely divided feed before such feed enters the calcining chamber; this is accomplished either by classifying the crushed limestone to remove the limestone dust therefrom before introducing the limestone into the reactor, or by utilizing one or more of the fluidized solids preheating chambers as a classifying chamber wherein the limestone is entrained in the fluidizing gas passing through such chamber and is carried out of the reactor to separate recovery.

However, such processes although highly successful are nevertheless subject to severe economic limitations in equipment cost and operation. These limitations are due mainly to the high temperatures at which the calcining chamber must be maintained as well as to the fact that the calcining temperatures may be intentionally varied over a considerable range in order to alter the characteristics of the calcined product. The successful calcination of limestone requires a temperature in the range of 1700 to 1950° F. and this means that the dust-laden gases leaving the calcining chamber are also of that temperature range. Moreover, since the calcining chamber is the hottest part of the reactor the gases exiting from such chamber occupy a relatively large volume due to heat-induced expansion. Further, whenever the calcining chamber temperature is raised or lowered it results in a raising or lowering of the exit gas temperature as well as in a change in the volume occupied by such gas and this volume change affects the efficiency of the cyclone.

The above factors, high temperature, large gas volume, and gas temperature and volume variations require that the cyclone employed to intercept calcining chamber exit gases must be constructed of expensive heat-resistant material and must be of sufficient size to handle the largest expectable gas volume in order that the gas load placed upon such cyclone does not seriously impair its efficiency.

So it is one object of this invention to provide ways and means whereby the cyclone employed to recover entrained calcined lime dust from dust-laden calcining chamber exit gases may be operated at a substantially constant lower temperature thus providing a substantially constant smaller gas volume entering the cyclone and allowing for the use of a smaller less expensive cyclone which will operate at a substantially constant efficiency level.

Broadly stated, this invention proposes to calcine finely divided limestone solids in a fluidized solids reactor having a plurality of fluidized beds including at least two such beds maintained under solids preheating conditions and at least one such bed maintained under solids calcining conditions. Hot lime-dust-laden gases exiting from the calcining bed are passed upwardly through at least one solids preheating bed where such dust-laden gases are conditioned as to temperature and volume for further handling in a dust-diminishing station, thence to a dust-diminishing station for recovery of the entrained lime dust after which the dust-free gas is discharged or sent to further use such as preheating while the recovered lime dust is utilized as valuable product.

An important feature of this invention lies in the discovery that the dust-laden gases entering the dust-diminishing station are automatically maintained at a substantially constant temperature and volume that is significantly lower than the temperature and volume of such gases as they leave the calcining bed thus rendering the operation of the dust-diminishing station uniformly efficient. This uniformity of temperature and volume is due to the discovery that, even though the temperature in the calcining bed may vary over a considerable range of say 200° F., nevertheless the temperature in the preheating bed through which the calcining chamber dust-laden exit gases pass will remain at a substantially constant but significantly lower temperature.

According to another feature of this invention gas-entrained calcined lime dust from the calcining bed is passed directly through the fluidized mass of uncalcined limestone solids in a preheating bed while in the presence of carbon dioxide gas and yet undesirable carbonation of the lime dust is avoided. This is accomplished by maintaining the fluidized mass of limestone solids at a temperature discouraging or inhibiting to lime carbonation; that is, at a temperature that favors limestone decomposition rather than lime carbonation or at a temperature whereby neither decomposition nor carbonation is favored; in short, a lime-carbonation discouraging temperature. Both of the foregoing features are interrelated, that is, the substantially constant preheating temperature is automatically maintained within a temperature range that discourages lime carbonation. This is especially important when calcining decrepitating limestone under solids fluidizing conditions such as described in U. S. Patent 2,548,642, because under such conditions large quantities of calcined lime dust are formed in the calcining chamber. It is especially advantageous to recover these large quantities of dust in substantially pure form from the entraining gases exiting from the calcining bed.

Before presenting a detailed description of the invention hereof it will be advisable to discuss the general nature and operation of fluidized solids reactors as referred to herein.

In general, in the fluidized solids technique for treating solids, a bed of finely subdivided solids is maintained as a dense mobilized homogeneous suspension behaving like a turbulent liquid and exhibiting a fluid-level. This is accomplished by passing through the bed an uprising stream of gas at a velocity sufficient to expand considerably the depth of the bed as well as to maintain its particles in turbulent suspension in the uprising gas stream, but at a velocity insufficient to cause the gas to entrain and carry out of the reactor any substantial quantity of solid particles. Under such conditions the bed is called a fluidized bed. The fluid-level of this fluidized bed is maintained by the use of a spill-pipe or overflow arrangement so that as more solid particles are introduced into the bed the resulting increased depth causes the particles to overflow down through the spill-pipe just as a fluid does.

In a reactor having a plurality of zones, several superposed beds are simultaneously maintained in such a fluidized state. Each fluidized bed is usually a separate distinct treatment stage. The treated solid particles from a superjacent bed are discharged or allowed to overflow to a subjacent bed for further treatment then overflowed to the next subjacent bed for even further treatment, etc. This process continues until the particles have passed through all of the fluidized beds after which they are discharged from the reactor.

Due to the turbulent nature of the fluidized beds, heat exchange by and among the particles thereof is almost instantaneous so that if two portions of particles, each at a different temperature from the other, are commingled in a fluidized bed the resulting mixture will almost instantly assume a temperature intermediate the temperatures of the portions commingled. Further, this rapid heat exchange creates a substantially uniform temperature throughout the bed.

A reactor having a plurality of superposed fluidized beds is generally employed to calcine finely divided limestone solids in order to produce lime therefrom. The fluidized beds are so arranged that at least two upper beds are preheating beds and at least one intermediate bed is a calcining bed wherein calcining and fuel combustion occur, and one or more further subjacent beds are utilized as calcined solids cooling and gas preheating beds. Incoming limestone is preheated in the upper preheating beds by heat transfer from hot gases rising from the calcining bed. Preheated solids are discharged from the preheating beds to the calcining bed where they are further heated by fuel combustion within that bed to calcining temperatures, and are calcined therein. Calcined lime is discharged to a subjacent cooling bed where it is cooled by heat transfer to uprising fluidizing gases thus at the same time preheating the uprising gas. The process is made continuous by continuously feeding limestone solids to the uppermost bed, overflowing the solids to the intermediate and lower beds, and finally to discharge. Variations of these processes provide for reactors having several beds for one or more of the separate zones. That is, there may be several calcining and combustion beds as well as a plurality of solids preheating and solids cooling beds.

The best embodiment of the invention now known to us has been selected for the purpose of illustration, but it is to be understood that it is illustrative only and not limiting for obviously changes in arrangement, construction and detail can be made without departing from the scope of the invention as defined in the appended claims, bearing in mind however that their requirements include equivalents thereof.

Figure 2:
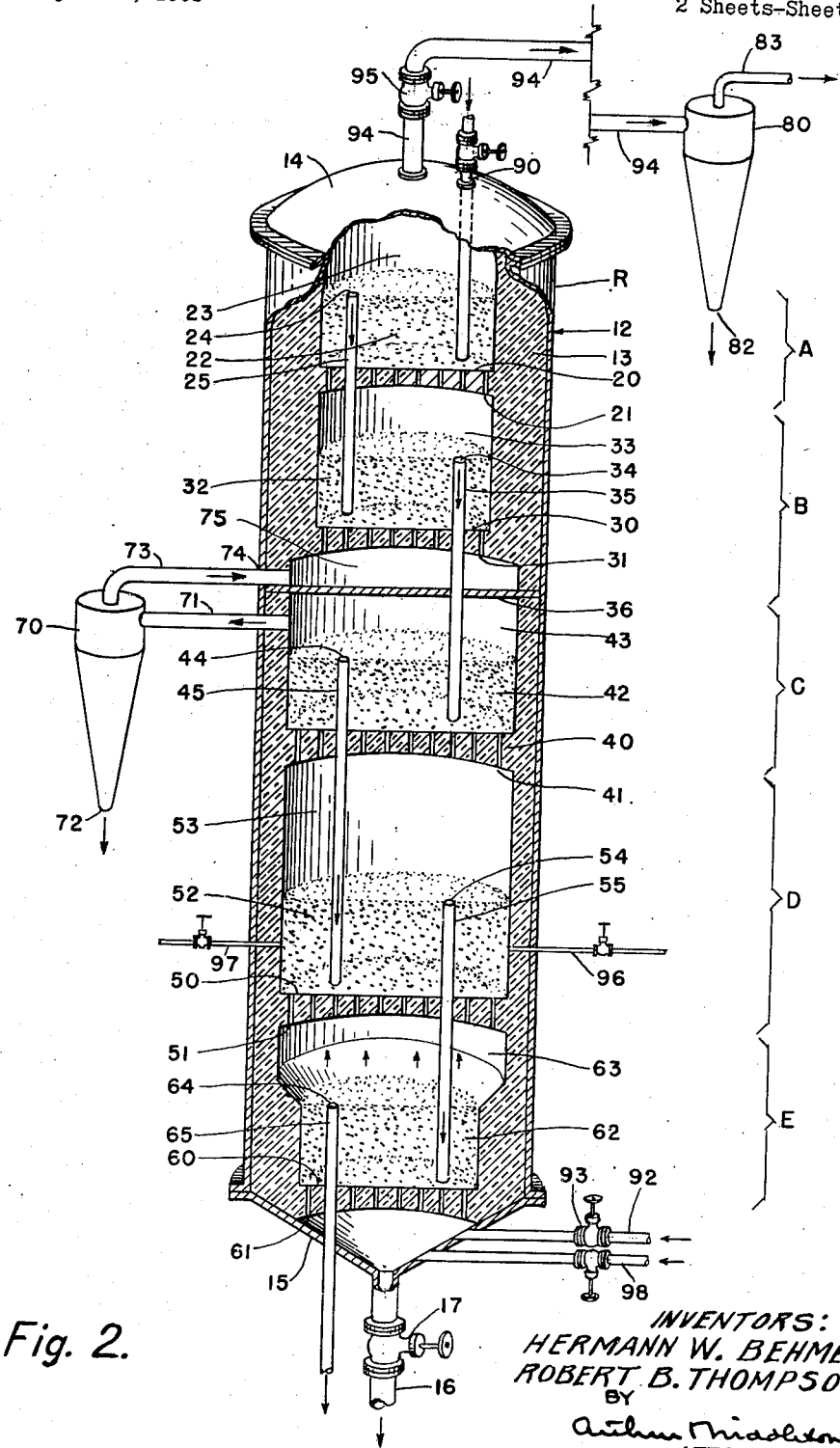

In the drawings, Figure 1 is an idealized partial view of a multi-chambered fluidized solids reactor such as the one shown in Figure 2 and shows the calcining and directly superjacent preheating zones. Figure 2 is a vertical sectional view of a preferred type of reactor showing this invention in a preferred embodiment.

In Figure 1, zone C is a preheating zone and zone D a calcining zone. Partially preheated limestone solids flow downwardly through downcomer 35 to enter limestone preheating bed 42 which rests upon constriction plate 40 having apertures 41 and is adapted to hold thereon a bed of solids 42 for preheating. Preheated limestone from bed 42 enters downcomer 45 at entrance-way 44 and flows downwardly through downcomer 45 to calcining bed 52 which rests upon constriction plate 50 having apertures 51. Bed 52 is maintained at calcining temperatures by supplying fuel thereto through conduits such as 96 and 97 and combusting such fuel within the bed. As the limestone is calcined in bed 52 a considerable quantity of it decrepitates or breaks down into ultra-fine calcined lime particles so that there exists in the bed both coarse and ultra-fine lime particles. The coarse particles enter downcomer 55 at entrance-way 54 and flow downwardlly to a cooling bed or to discharge. The ultra-fine particles are entrained in the uprising fluidizing gas and are carried out of bed 52 upwardly through freeboard space 53 thence through apertures 41 of constriction plate 40 into bed 42. The fine particles are then carried upwardly through bed 42 and freeboard space 43 finally leaving the reactor via conduit 71. These entrained lime solids are carried, via conduit 71, to dust-diminishing station 70 where the solids are separated from the entraining gas. The substantially dust-free gase exits from dust-diminishing station 70 via conduit 73 while the separated lime solids exit at 72.

In Figure 2 the total assembly called a reactor R is preferably a vertical cylinder made up of zones such as A, B, C, D and E suitably secured together, each having a metal outer wall 12 and lined with insulation and fire brick 13. The reactor has a top 14 and a coned bottom 15 provided with an outlet 16 suitably valved as at 17. Zone A is provided with a constriction plate 20 having a plurality of orifices such as that one shown at 21. The plate extends across the reactor through its cross-sectional area and is adapted to hold thereon a fluidized bed 22 of finely divided limestone solids being heated by heat transfer, above which is a freeboard space 23.

Zone B has a similar constriction plate 30 with orifices such as at 31 and is adapted to hold thereon a fluidized bed 32 of such solids being heated by heat transfer above which is a freeboard space 33. Zone C has a constriction plate 40 with orifices such as at 41 and is adapted to hold thereon a fluidized bed 42 of such solids being heated by heat transfer above which is a freeboard space 43. Zone D has a constriction plate 50 with orifices such as at 51 and is adapted to hold thereon a fluidized bed 52 of such solids being calcined, above which is a freeboard space 53. Zone E has a constriction plate 60 with orifices such as at 61 and is adapted to hold thereon a fluidized bed 62 of calcined solids being cooled by heat transfer, above which is a freeboard space 63. Zones A, B and C are preheating zones, zone D is a combustion and calcination zone, and zone E is a calcined solids cooling zone.

The fluidized bed 22 in zone A has its fluid level controlled by the entrance 24 to conduit or spill pipe 25. The overflowing solids from bed 22 drop through conduit 25 into bed 32 in subjacent zone B. The fluid-level of bed 32 in zone B is similarly controlled by the entrance 34 to conduit or spill-pipe 35 through which the overflowing solids drop into bed 42 in zone C. Similarly the fluid-level of bed 42 in zone C is controlled by entrance 44 to conduit or spill-pipe 45 through which solids drop into bed 52 in zone D. The fluid-level of bed 52 in zone D is controlled by entrance 54 into conduit or spill-pipe 55 through which calcined solids pass to bed 62 in subjacent zone E. The fluid-level of bed 62 is controlled by entrance 64 to conduit 65 through which cooled calcined particles pass to discharge.

A solid partitioning plate 36 is provided in zone B below constriction plate 30 and extending throughout the cross-sectional area of the reactor in order to create a windbox 75 and to prevent the exit gases rising from bed 42 in zone C from passing directly through constriction plate 30 into bed 32.

Fluidizing gas is supplied to the reactor via conduit 92 which is suitably valved as at 93. This gas passes upwardly through the constriction plate 60, thence through bed 62, thence through freeboard space 63, thence through constriction plate 50 and bed 52, thence through freeboard space 53, thence through constriction plate 40 and bed 42, thence through freeboard space 43 from whence it is discharged via conduit 71 to dust-diminishing station 70. In dust-diminishing station 70 entrained lime dust is separated from the gases and this dust is discharged at 72 while the substantially dust-free gases are discharged via conduit 73 to enter the reactor at 74 into windbox 75 below constriction plate 30. The gases then rise upwardly through constriction plate 30 and bed 32, thence through freeboard space 33 and finally through constriction plate 20, bed 22, freeboard space 23, and finally are discharged from the reactor via conduit 94 suitably valved as at 95 to a further dust-diminishing station 80.

In dust-diminishing station 80 any entrained dust is separated from the discharge gases and this entrained dust is discharged at 82 while the dust-free gases are discharged at 83. Fuel to provide heat for the calcination is supplied to bed 52 via suitably valved conduits 96 and 97. Oxygen to support the combustion of this fuel is provided in the fluidizing gas which enters through conduit 92.

A pipe 98 suitably valved and provided with a burner is provided at the bottom of the reactor to supply heat for starting up; however any type of preheating torch can be used. Preheating is used only until the temperature in calcining and combustion bed 52 is sufficiently high to completely combust the fuel being supplied thereto via conduits 96 and 97. Usual means can be provided for temperature and pressure readings in the various beds or zones but are omitted from the drawing to avoid unnecessarily complicating it.

In starting up the reactor R heat is supplied initially through conduit 98 and its attached burner (not shown) while the beds are established and maintained by continuously feeding solids into bed 22 through suitably valved conduit 90 and the solids are allowed to flow downwardly through the overflow conduits as previously described. Fluidizing and combustion supporting gases are introduced through pipe 92.

When the reactor is in full and continuous operation zone D is the hottest zone and is where calcination and combustion take place. Here the temperature must be maintained sufficiently high so that calcination of the limestone solids will take place and the fuel supplied through conduits 96 and 97 will be substantially combusted. In zone C where preheating conditions are maintained the solids of bed 42 must be kept within a temperature range that is discouraging to lime carbonation. This temperature is lower than the temperature of zone D where combustion and calcination take place. Solids in bed 42 are preheated by the transfer of sensible heat from the dust-laden hot gases rising from zone D while the solids in beds 22 and 32 are preheated by transfer of sensible heat from the substantially dust-free hot gases rising from windbox 75.

The diameter of the enclosed fluidized beds 22 and 32 is smaller than the diameter of fluidized beds 42 and 52 while the orifices in plates 20 and 30 are increased in number or size or both. This is to insure that the uprising gas will have sufficient velocity to fluidize the solids in beds 22 and 32. That is, as the gases pass through beds 32 and 42 they lose heat and hence occupy a smaller volume and their upward velocity is correspondingly decreased. Therefore it is necessary to provide a correspondingly smaller volume for such gases to pass through in order to maintain them at fluidizing velocities. Similarly the diameter of bed 62 is also smaller than that of beds 42 and 52. This is so because cool fluidizing gas entering through conduit 92 occupies a relatively small volume and a decreased bed diameter is required in order to insure fluidizing velocities in bed 62.

In some cases it may be necessary to decrease the diameter of bed 32 in order to maintain solids fluidization therein, however this will depend upon the particular case and upon the volume and velocity of the fluidizing gases used. An alternate method for insuring fluidization in the upper preheating beds would be to supply additional fluidizing gases to those beds, but this involves additional operating expense and for this reason the method shown in the drawings is preferred.

By proper design, bed 22 may be operated as a limestone solids sizing bed wherein limestone dust is removed. Such a design would provide for a decreased diameter in such bed in order to insure a sufficiently high fluidizing gas velocity to entrain limestone dust and carry it from the bed. Such design would further provide for an increase in the number or diameter of orifices in order to maintain a reasonable pressure drop through the constriction plate. If such a design is employed then it would be unnecessary to separately remove limestone dust from the limestone solids before such solids are introduced into the reactor.

An alternate design, not shown in the drawings, includes locating the dust-diminisher or cyclone 80 within the freeboard space 43, above bed 42, so that heat loss from the gases due to radiation is kept at a minimum.

*Example*

The operation of an embodiment of this invention will be described in connection with the calcination of finely divided limestone in a commercial fluidized solids reactor of the type shown in Figure 1 of the drawings.

The reactor employed has an overall height of 45½ feet and a maximum inside diameter in the calcining bed of 12 feet. The solids preheating bed directly superjacent to the calcining bed is 12 feet in diameter while the next superjacent preheating bed is 11¼ feet in diameter and the uppermost bed has a diameter of 10 feet. The lowermost solids-cooling gas-preheating bed has a diameter of 8 feet. It is also to be noted that in addition to changing the bed diameter the number of orifices in the various constriction plates is increased or the size of such orifices is increased so as to allow free passage of the uprising gases. Bed depths are maintained as follows: preheating beds, 2 feet; calcining bed, 5 feet; and solids cooling bed, 2 feet. Heighth of freeboard spaces above the beds is as follows: above uppermost bed, 4' 6''; above next two subjacent beds, 3' 6''; above calcining bed, 5 feet; and above cooling bed, 3' 6''.

Fluiding gas enters through conduit 92 in sufficient quantity and under sufficient pressure so that it has an upward velocity through the reactor of approximately 2 feet per second. This velocity is computed without reference to the solids present in the reactor; that is, the 2 feet per second is the upward velocity which the gas would have if there were no solids in the reactor. This velocity is referred to as space rate. Due to volume changes in the gas as it passes through the reactor, the space rate is maintained substantially constant throughout the reactor.

Solids to be treated are introduced into the top of the reactor and flow successively downwardly through the beds so that cooled calcined solids are discharged from the bottom of the reactor. In this case the solids are pre-classified to remove a major portion of the limestone dust before introducing such solids into the reactor. Any remaining dust is either passed downwardly through the reactor for calcination therein or is blown from the reactor by the gases exiting from the uppermost bed. Gases exiting from the top of the reactor are discharged to a cyclone for separation of any remaining entrained dust.

Liquid fuel is injected into the calcining bed and is combusted therein in sufficient quantities to maintain the solids of such bed at calcining temperatures in the range of 1700 to 1950° F. depending upon the product desired. Dust-laden gases exiting from the calcining chamber pass upwardly through the directly superjacent preheating bed and the solids of such bed are automatically maintained in the temperature range of 1500 to 1600° F. As solids are calcined in the calcining bed a considerable quantity of them decrepitate or break down forming lime dust. A large quantity of this dust is entrained in the uprising fluidizing gas and is carried from the calcining bed upwardly through the directly superjacent limestone preheating bed thence to a cyclone where the entrained lime dust is recovered in substantially pure form. The dust-free gases are discharged from the cyclone for further use in the remaining preheating beds.

When in normal operation fluidizing gas is supplied to the bottom of the reactor at a rate of approximately 3300 C. F. M. (measured at 60° F. and one atmosphere of pressure). Depending upon the temperature maintained in the calcining bed, which may lie in the range from 1700 to 1950° F., relative conditions existing in the calcining bed and directly superjacent preheating bed are as follows:

| Temperature of gases discharged from calcining bed | Volume of gases leaving calcining bed, C. F. M. | Temperature of gases discharged from preheating bed, °F. | Volume of gases leaving preheating bed, C. F. M. |
|---|---|---|---|
| 1,740° F | 15,400 | 1,565 | 15,000 |
| 1,850° F | 16,150 | 1,580 | 15,100 |
| 1,950° F | 17,000 | 1,590 | 15,300 |

Thus, when the temperature in the calcining bed undergoes a 210° F. change yet the temperature of the preheating bed changes only 25° F.

This reactor has an average production capacity of approximately 107 tons of calcined lime per twenty-four hours. About thirteen tons per twenty-four hours of this product are carried out of the calcining bed as gas-entrained lime dust and passed upwardly through the directly superjacent preheating bed thence to a dust cyclone where it is recovered as substantially pure calcined lime product.

We claim:

1. The process for heat treating finely-divided limestone to yield calcined lime, which comprises the steps of establishing and maintaining within an enclosed chamber three superposed beds of finely-divided solids including an upper and an intermediate solids-preheating bed maintained under solids-preheating conditions and a lower solids-calcining bed maintained at limestone calcining temperatures, continuously supplying finely-divided limestone solids into the upper preheating bed, preheating such solids in such bed, transferring such preheated solids to the intermediate preheating bed, further preheating the solids in the intermediate bed and then transferring the further preheated solids to the calcining bed, maintaining each such bed as a fluidized bed wherein its solids are maintained as a dense mobilized homogeneous suspension behaving like a turbulent liquid and exhibiting a fluid level by passing upwardly through the calcining bed and thence successively through the intermediate and upper beds an uprising stream of gas at fluidizing velocities, calcining solids within the calcining bed to form finely-divided calcine lime solids as well as calcined lime dust discharging calcined solids from the latter bed, entraining a portion of the lime dust formed in the latter bed in the uprising gases, passing these uprising gases together with entrained lime dust upwardly through the intermediate preheating bed so that they are cooled during passage through said intermediate bed, transferring the resulting cooler gases and entrained lime dust to a dust-diminishing station to separate said dust from said gases, discharging separated lime dust from the latter station, passing the resulting dust-diminished gas upwardly through the upper solids preheating bed, and maintaining the dust-laden gases entering the dust diminishing station at a substantially constant temperature that is significantly lower than the temperature at which such gas leaves the calcining bed and without recarbonation of the entrained lime dust by maintaining the intermediate bed at a temperature discouraging to lime carbonation that is significantly lower than the temperature of said calcining bed.

2. The process according to claim 1 wherein the temperature of the dust-laden gases exiting from the calcining bed is maintained to lie in the range of 1700° F. to 1900° F.

3. The process according to claim 1 wherein the temperature of the dust-laden gases exiting from the limestone solids preheating bed through which such gases pass before entering the dust-diminishing station is maintained to lie in the temperature range of substantially 1500° F. to 1600° F.

References Cited in the file of this patent

UNITED STATES PATENTS

| Number | Name | Date |
|---|---|---|
| 2,409,707 | Roetheli | Oct. 22, 1946 |
| 2,529,366 | Bauer | Nov. 7, 1950 |
| 2,541,186 | Anderson | Feb. 13, 1951 |
| 2,548,642 | White | Apr. 10, 1951 |